(12) United States Patent
Fremaux (10) Patent No.: US 11,724,764 B2
(45) Date of Patent: Aug. 15, 2023

(54) COMPENSATING THE TEMPERATURE DRIFT OF AN ACCELEROMETER ON BOARD A TWO-WHEELED MOTOR VEHICLE FOR MEASURING VEHICLE TILT

(71) Applicant: Vitesco Technologies GmbH, Regensburg (DE)

(72) Inventor: Jean-Luc Fremaux, Toulouse (FR)

(73) Assignee: Vitesco Technologies GmbH

( * ) Notice: Subject to any disclaimer, the term of this patent is extended or adjusted under 35 U.S.C. 154(b) by 0 days.

(21) Appl. No.: 17/797,827

(22) PCT Filed: Mar. 5, 2021

(86) PCT No.: PCT/EP2021/055544
§ 371 (c)(1),
(2) Date: Aug. 5, 2022

(87) PCT Pub. No.: WO2021/180574
PCT Pub. Date: Sep. 16, 2021

(65) Prior Publication Data
US 2023/0054694 A1 Feb. 23, 2023

(30) Foreign Application Priority Data
Mar. 9, 2020 (FR) ...................................... 2002287

(51) Int. Cl.
*B62J 45/41* (2020.01)
*B62J 45/415* (2020.01)
*G01D 3/036* (2006.01)

(52) U.S. Cl.
CPC ........ *B62J 45/4151* (2020.02); *G01D 3/0365* (2013.01)

(58) Field of Classification Search
CPC ... B62J 45/4151; G01D 3/0365; G01D 18/00; G01D 3/08; B60T 8/885; B60T 2250/06;
(Continued)

(56) References Cited

U.S. PATENT DOCUMENTS 4,836,025 A * 6/1989 Mihara ............... H10N 39/00
73/497
5,208,652 A * 5/1993 Sonobe ............... G01C 19/72
385/12
(Continued)

FOREIGN PATENT DOCUMENTS

| DE | 10003832 A1 | 8/2001 |
| FR | 3083758 A1 | 1/2020 |
| JP | 2007322347 A | 12/2007 |

OTHER PUBLICATIONS

English Translation of the Written Opinion for International Application No. PCT/EP2021/055544, dated May 18, 2021, 6 pages.
(Continued)

*Primary Examiner* — Behrang Badii
(74) *Attorney, Agent, or Firm* — RatnerPrestia (57) ABSTRACT

A method for compensating for a temperature drift of an accelerometer for measuring the lateral tilt of a motorbike. When the vehicle is in the "bike upright" condition, and the temperature of the accelerometer is at least 30° C. above its reference temperature, a reading is taken of the acceleration values. These values are then processed in order to identify the coefficient of the slope of the straight line for correcting the offset of each axis of the accelerometer. A processing operation involves verifying the strict monotony of the coefficients in at least two successive readings and ensuring that the mean value thereof is included between determined limits. The mean coefficient that is finally obtained then can be used to correct the temperature of accelerations read over the entire operating range of the accelerometer. Thus, the computation of the tilt angle of the motorbike is more precise.

13 Claims, 6 Drawing Sheets

(58) Field of Classification Search
CPC ......... B60T 8/1706; G01C 9/00; G01P 1/006; G01P 15/18; G01P 21/00
See application file for complete search history.

(56) References Cited

U.S. PATENT DOCUMENTS

| | | | |
|---|---|---|---|
| 6,089,087 A * | 7/2000 | Fujimoto | G01C 19/5663 |
| | | | 73/504.15 |
| 8,718,938 B2 * | 5/2014 | Wolf | G06F 1/3287 |
| | | | 33/355 R |
| 2003/0036847 A1 * | 2/2003 | Geier | G01C 21/28 |
| | | | 701/472 |
| 2003/0132837 A1 | 7/2003 | Hasegawa et al. | |
| 2004/0194327 A1 | 10/2004 | Bryan | |
| 2004/0199300 A1 | 10/2004 | Gustafsson et al. | |
| 2008/0234935 A1 * | 9/2008 | Wolf | A61B 5/0024 |
| | | | 701/472 |
| 2010/0283832 A1 * | 11/2010 | Lin | G06F 18/256 |
| | | | 348/46 |
| 2014/0116133 A1 * | 5/2014 | Sheynblat | G01C 21/188 |
| | | | 73/504.02 |
| 2021/0025273 A1 * | 1/2021 | Zeller | G01C 7/02 |

OTHER PUBLICATIONS

Ruzza et al., "Thermal Compensation of Low-Cost MEMS Accelerometers for Tilt Measurements", Sensors, vol. 18(8), Aug. 2, 2018, 18 pages, XP055744987.

International Search Report and Written Opinion for International Application No. PCT/EP2021/055544, dated May 18, 2021, with partial translation, 11 pages.

International Search Report and Written Opinion for International Application No. PCT/EP2021/055544, dated May 18, 2021, 16 pages (French).

* cited by examiner

COMPENSATING THE TEMPERATURE DRIFT OF AN ACCELEROMETER ON BOARD A TWO-WHEELED MOTOR VEHICLE FOR MEASURING VEHICLE TILT

CROSS REFERENCE TO RELATED APPLICATIONS

This application is the U.S. National Phase Application of PCT International Application No. PCT/EP2021/055544, filed Mar. 5, 2021, which claims priority to French Patent Application No. 2002287, filed Mar. 9, 2020, the contents of such applications being incorporated by reference herein.

FIELD OF THE INVENTION

The present invention generally relates to the detection of the tilt of a two-wheeled vehicle using an on-board accelerometer, and more specifically to the compensation of the temperature drift of such an accelerometer.

The invention is particularly applicable in a computer of a two-wheeled motor vehicle with a combustion engine comprising an accelerometer for measuring, while the vehicle is running, the bank angle of the vehicle with automatic engine cut-off when a tilt threshold is exceeded.

BACKGROUND OF THE INVENTION

An autonomous sensor for measuring the lateral tilt of a two-wheeled vehicle of the motorbike or similar type, such as an inertial unit or an attitude gyro, can be used to determine its tilt in order to cut-off the engine when this tilt is above a threshold that is considered to be critical. The purpose of this function of automatically cutting-off the engine when a lateral tilt threshold is exceeded is to protect the user, in the event of a fall, against the potential consequences associated with the moving parts (the drive wheel, the chain, etc.) of the motorbike, and from the risk of the whole catching fire in the event of a fuel spillage that the accident may have caused.

In the latest motorbikes, such an autonomous sensor is replaced by a multi-axis accelerometer, for example, of the type having three axes, X, Y and Z. This type of accelerometer is now available as a "standalone" monolithic integrated circuit and can be integrated into the printed circuit of an on-board electronic computer. When combined with a software function, such an accelerometer is able to estimate the tilt of the vehicle, thus avoiding the need to equip the vehicle with a dedicated attitude gyro, with the additional benefit of substantial savings.

Computing the tilt of the vehicle is dependent on the physical measurements taken by the sensors of the accelerometer, which are generally sensitive cells of the single-axis, two-axis (or 2D, for "two dimensions of measurement") and/or three-axis (or 3D, for "three dimensions of measurement") type, integrated into the same chip of a semiconductor product. The use, in such a chip, of micro-electromechanical systems (MEMS) with original structures, for example, having several beams and several piezoelectric strain gauges and/or interdigitated capacitive fingers (produced by etching thin surface layers), can be used for measuring accelerations in the plane of the chip and outside of said plane, allowing sensitivity to be obtained in all three axes using one or more sensitive cells. In general, accelerometers exploit the difference in loading between each of the axes, with the beams being loaded in torsion and/or in bending according to the direction of the acceleration to which the accelerometer is subjected. Furthermore, detection using suitable electronics allows the level of loading in the direction of each axis to be measured.

It is known that the measurements from the accelerometer can vary as a function of the surrounding temperature and, thus, lead to an error in estimating the tilt angle of the vehicle. Indeed, the accelerometers employ technology that makes them somewhat sensitive to the temperature at which they are operating.

This temperature drift of accelerometers is discussed, in another application context, for example, in the article entitled, "*Thermal Compensation of Low-Cost MEMS Accelerometers for Tilt Measurements*", by Giuseppe Ruzza, Luigi Guerriero, Paola Revellino and Francesco M. Guadagno, published online by MDPI AG, on Aug. 2, 2018, in the open-access scientific journal "Sensors" (ISSN 1424-8220; CODEN: SENSC9), incorporated herein by reference.

In the application context contemplated for the invention, an error in the acceleration measurement leads to an error in the estimated tilt of the vehicle. As the function of automatically cutting-off the engine has the end result of cutting-off the engine when the maximum tilt threshold is exceeded, an estimation error can lead to the engine being cut-off too early, which can compromise the safety of the motorbike rider.

For this reason, it would appear to be desirable to compensate for the temperature drift of an accelerometer used for measuring the tilt angle of two-wheeled vehicles notably, but not solely, for carrying out the aforementioned function of automatically cutting-off the engine.

In general, a measuring instrument involving a sensor converts a physical parameter into an electrical signal, which then can be converted into digital data. "Calibration", which should not be confused with "gauging", aims to ensure that individual measuring instruments from the same range (same make, same model) do indeed yield the same measurement result when faced with the same situation. Therefore, a procedure is required that allows the same situation to yield the same result.

With reference to the International Vocabulary of Metrology (VIM), incorporated herein by reference, and according to the definition thereof provided in editions dating from 2008 onwards, the calibration of a measuring instrument can be defined (leaving aside the measurement uncertainties) as a procedure that, under specified conditions, in a first phase, establishes a relation between measurement values that are provided by measurement standards and corresponding indications that are provided by the instrument and, in a second phase, uses a relation for obtaining a measurement result from any indication provided by the instrument. Therefore, a calibration can be expressed in the form of a statement, of a calibration function, of a calibration diagram, of a calibration curve or of a calibration table. For sensor-type measuring instruments, the first phase of the calibration is to characterize the response of the sensor over the entire operating range of the sensor. The second phase involves exploiting the results of the first phase. In certain instances (notably if the sensor is not adjustable so that adjustment is impossible), the second phase can involve applying an additive or multiplicative correction to the indication provided by the instrument.

In the context of 3D accelerometers used in the contemplated types of applications described above, the aim of the invention is to avoid such characterization of the accelerometers from axis-to-axis, and testing MEM-by-MEM that have to be carried out in order to define a correction polynomial associated with each MEM, with these being, at the very least, lengthy and expensive. Such characterization generally cannot be carried out autonomously by means on board the vehicle, such as the engine control unit of a motorbike, for example, which unit has limited computing and memory-storage capabilities.

This is especially true given that, in a two-wheeled vehicle with a combustion engine, the temperature in the vicinity of the engine control unit, which, in general, incorporates the accelerometer, varies within a very wide range of values. This ambient temperature of the accelerometer in effect typically varies between −20° C. on start-up (with this generally being the lowest outdoor temperature, in winter, in the countries for which the applications of the invention are intended) and +90° C. when the engine is fully hot (which is generally the maximum temperature reached by the engine during operation, given the cooling means (radiator, fan, etc.) that are implemented, where appropriate.

The invention is based on the observation that the variation in the acceleration measurement as a function of ambient temperature, which is intrinsic to the accelerometer technology, can be learned in a simple and effective way specifically for each particular accelerometer and then can be taken into account in a measurement yielded by said accelerometer, thus allowing the errors in estimating the tilt of the vehicle to be reduced.

Document JP 2007/322347A, incorporated herein by reference, discloses a compensation for the measurements of accelerometers as a function of temperature, so as to detect the tilt of a four-wheeled vehicle, which tilt might be due to the vehicle lifting as the result of the theft of a tire. The document proposes a calibration solution, with a temperature correction based on updates of sensor voltage reference values.

Document US 2004/0194327A1, incorporated herein by reference, discloses determining angles of the geometry of the drive train of a four-wheeled vehicle, with compensation for the temperature drift by correcting the tilt angle using calibration.

SUMMARY OF THE INVENTION

For its part, the invention proposes a method with a first phase involving learning, preferably along each of the three axes of a 3D accelerometer, for example, the temperature drift (this is also referred to as a temperature offset) due to a change in its operating temperature, and with a second phase comprising correcting this drift as a function of the current temperature at the time of any arbitrary measurement.

More specifically, a method is proposed for compensating for a temperature drift of an accelerometer for measuring the tilt of a two-wheeled motor vehicle with a combustion engine, said method having:

a learning phase for learning the temperature drift of the accelerometer, comprising:

acquiring a reference acceleration value at a reference measurement point at which the vehicle is upright and the temperature is equal to a first reference temperature value, which is included within a range of reference temperature values corresponding to an "engine cold" state, and which is stored in a non-volatile memory in relation to the reference acceleration value;

acquiring a first acceleration measurement value at a first measurement point, different from the reference measurement point, and at which the vehicle is substantially upright and the temperature is equal to a first temperature measurement value, which is included within a first range of temperature values substantially above the first reference temperature value;

computing a first temperature drift coefficient, defined as being the ratio of the difference between the first acceleration measurement value and the reference acceleration value, on the one hand, to the difference between the first temperature measurement value and the first reference temperature value, on the other hand;

acquiring a second acceleration measurement value at a second measurement point, at which the vehicle is substantially upright and the temperature is equal to a second temperature measurement value, which is included within a second range of temperature values substantially above the first temperature measurement value;

computing a second temperature drift coefficient, defined as being the ratio of the difference between the second acceleration measurement value and the reference acceleration value, on the one hand, to the difference between the second temperature measurement value and the first reference temperature measurement value, on the other hand; and obtaining and storing, in the non-volatile memory, a single temperature drift coefficient, on the basis of the first temperature drift coefficient and of the second temperature drift coefficient; as well as, a correction phase, in which an acceleration value indicated by the accelerometer at a given measurement point at which the temperature is equal to a current temperature value is corrected as a function of the difference between said current temperature value and the reference temperature value, on the one hand, and of the single temperature drift coefficient, on the other hand.

By virtue of this method, it is possible to determine the tilt of a two-wheeled vehicle, while it is running, corrected for the temperature drift of the accelerometer, with prior learning of the temperature drift of the accelerometer specifically used in the relevant vehicle, which learning is autonomously carried out on the actual vehicle by the on-board means.

Unlike the calibration procedures as disclosed in document JP 2007/322347A and in document US 2004/0194327A1, which were identified and briefly discussed in the introduction, the learning phase of the method according to embodiments of the invention allows a temperature compensation to be applied to the indications provided by the accelerometer, which takes into account any divergences in features affecting the accelerometers that are likely to be used. In other words, the learning according to the proposed method allows any divergences in features of the components to be taken into account when they are manufactured, which offers an advantage over a calibration method. Divergences in features is understood to mean the fact that the accelerometers do not intrinsically react in exactly the same way due to variable factors that necessarily affect the manufacture thereof on an industrial scale.

Furthermore, the method does not need to be aware of a temperature-correction curve covering the entire range of accelerometer operating temperatures, which curve would be the result of a lengthy and painstaking characterization phase.

Furthermore, unlike the solution disclosed in document JP 2007/322347A, the proposed method does not have the disadvantage of needing to update voltage references of the one or more sensor(s).

Thus, as will be apparent to a person skilled in the art, the embodiments of the proposed method are advantageously characterized, on the one hand, by the learning strategy that can be specifically implemented for each accelerometer once it has been installed in the vehicle, and which can be carried out autonomously by means on board said vehicle and, on the other hand, by the fact that said learning strategy involves estimating the temperature drift in at least two steps, on each occasion between two measurement points that are spaced apart within the range of operating temperatures of the accelerometer, in order to efficiently and precisely compensate for the temperature drift of the accelerometer.

Embodiments, taken individually or in combination, also make provision for:

obtaining and storing the single temperature drift coefficient, which can only be carried out if the first temperature drift coefficient and the second temperature drift coefficient are signed numerical values having the same sign;

obtaining and storing the single temperature drift coefficient, which can only be carried out if, in addition, the absolute value of the difference between the respective absolute values of the first temperature drift coefficient and of the second temperature drift coefficient is below a determined threshold;

obtaining and storing the single temperature drift coefficient, which can only be carried out if, in addition, the absolute value of the first temperature drift coefficient and the absolute value of the second temperature drift coefficient are included within a determined range of values;

the single temperature drift coefficient can be obtained by computing a mean of the first temperature drift coefficient and of the second temperature drift coefficient;

the first range of temperature values can include temperature values at least 30° C. above the reference temperature value;

the second range of temperature values can include temperature values at least 30° C. above the first temperature measurement value;

the range of reference temperature values can include temperature values between −20° C. and +55° C.;

with the accelerometer being a multi-axis accelerometer, all the steps of the method can be carried out simultaneously for each axis of the accelerometer;

acquiring a reference acceleration value at the reference measurement point can be carried out, with the engine switched off, as it leaves the vehicle production line, whereas the other steps of the learning phase for learning the temperature drift of the accelerometer can be carried out subsequently, with the engine running.

In a second aspect, a further aim of the invention is a device for compensating for a temperature drift of an accelerometer for measuring the tilt of a two-wheeled motor vehicle with a combustion engine, comprising an electronic control unit for the two-wheeled motor vehicle with a combustion engine comprising an accelerometer and means for measuring, while the vehicle is running, the lateral tilt of the vehicle with automatic cut-off of the engine when a tilt threshold is exceeded, means for determining the ambient temperature, means for determining the engine temperature, means for determining whether the vehicle is upright, and having means adapted to execute all the steps of the method according to the aforementioned first aspect. It can be a computer configured for this purpose, for example, an engine control unit of the motorbike.

A third aspect of the invention relates to a computer for a two-wheeled motor vehicle with a combustion engine, comprising an accelerometer and a device according to the second aforementioned aspect for measuring, while the vehicle is running, the lateral tilt of the vehicle with automatic cut-off of the engine when a tilt threshold is exceeded. It particularly can be the engine control unit of the motorbike.

When the indication yielded by the accelerometer, i.e., an acceleration measurement, is exploited by a computer in which on-board software is executed, the learning and then the correction can be carried out by the software.

For this reason, in a fourth and final aspect, a further aim of the invention is a computer program product comprising one or more sequences of instructions stored on a machine-readable storage medium comprising a processor, with said sequences of instructions being suitable for carrying out all the steps of the method according to the first aspect of the invention when the program is read from the storage medium and executed by the processor.

BRIEF DESCRIPTION OF THE DRAWINGS

Further features and advantages of the invention will become more clearly apparent from reading the following description. This description is purely illustrative and should be read in conjunction with the appended drawings, in which.

DETAILED DESCRIPTION OF THE PREFERRED EMBODIMENTS

In the following description of embodiments, and in the figures of the appended drawings, identical elements or similar elements bear the same reference numerals in the drawings.

In the disclosure to be provided hereafter, the following notations will be employed:

the letters X, Y and Z respectively denote the longitudinal, lateral and vertical axes of the frame of reference associated with the Earth (also referred to as the Earth frame of reference);

{Ax, Ay, Az} denotes a triplet of acceleration values measured by the 3D accelerometer, respectively along each of the three axes X, Y and Z, respectively; in practice, the accelerometer continuously generates such triplets of values, namely at a determined measurement frequency;

g denotes the acceleration due to gravity; the acceleration g is provided in meters per second squared (m/s$^2$), or Gforce (g), which is equal to 9.81 m/s$^2$;

T° denotes the ambient temperature in the vicinity of the accelerometer, which can be provided by a temperature sensor arranged, for example, in close proximity to the computer incorporating the accelerometer, or inside the housing of said computer;

Tref, T1 and T2 denote determined values of the temperature T°, at which values a reference measurement of the acceleration values {Ax_ref, Ay_ref, Az_ref}, a first acceleration values learning measurement {Ax_T1, Ay_T1, Az_T1} and a second acceleration values learning measurement {Ax_T2, Ay_T2, Az_T2}, respectively, are provided by the accelerometer;

θ denotes the bank angle of the vehicle, and therefore of the accelerometer it incorporates;

Slope_1, Slope_2 and Slope_cor are coefficients for the temperature drift of the accelerometer, expressed in g/° C., and which can adopt positive or negative values; they correspond to the slope of straight-line portions that can represent the temperature drift of the accelerometer, to a first approximation; this representation will sometimes be referred to in terms of "slope coefficient".

A two-wheeled motor vehicle, such as a motorbike or similar, moves in a three-dimensional space, which can be defined by three axes, which are perpendicular in pairs, which are associated with the Earth. These X, Y and Z axes are referred to hereafter as the longitudinal, lateral and vertical axes, respectively. Compared with a vehicle with 4 wheels or more, the horizontal plane of which remains substantially parallel to the surface of the Earth and more specifically to the plane of the road at the considered point, the particular feature of a two-wheeled vehicle is its ability to be tilted with respect to the vertical, particularly in corners.

Due to the effect of gravity, an accelerometer, and particularly a 3D accelerometer, can indicate how an object is oriented in relation to the Earth. On a smartphone, for example, this is used to switch the display from portrait mode to landscape mode. In a joystick, a 3D accelerometer is able to monitor the movements in space of the hand of the gamer, and this is used by the game as an interface with the gamer. One of the applications of an accelerometer in a two-wheeled vehicle is to compute the tilt of the vehicle with respect to the vertical, particularly in the context of the function of automatically cutting-off the combustion engine when a determined tilt threshold is exceeded.

For an object moving in a three-dimensional space, such as an aircraft in the sky or a vessel on the surface of rough seas, the tilt due to rotation about the longitudinal X axis is known as "roll", the tilt due to rotation about the lateral Y axis is known as "pitch", and the tilt due to rotation about the vertical Z axis is known as "yaw". By convention, the tilt angle is usually counted positively, for each axis, for a rotation about said axis in the counter-clockwise direction.

For a two-wheeled motor vehicle, such as a motorbike or similar, the term "tilt angle" is used for a tilt angle along the longitudinal X axis, along the lateral Y axis, and along the vertical Z axis, respectively. Monitoring this last tilt, i.e., the tilt along the vertical Z axis, is of particular importance for the stability of motorbikes and the safety of their users. It is also referred to as "bank" and the corresponding tilt angle is known as the "bank angle".

Figure 1A:
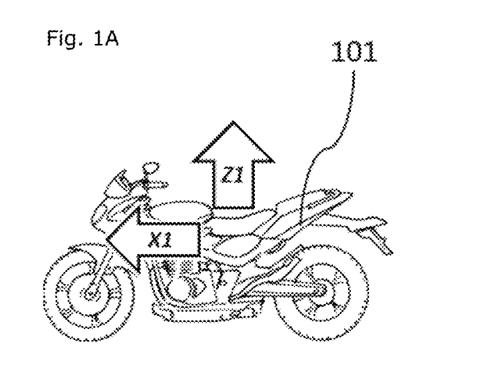
FIG. 1A is a diagram showing a side view of a motorbike, in which the method can be implemented.
Figure 1B:
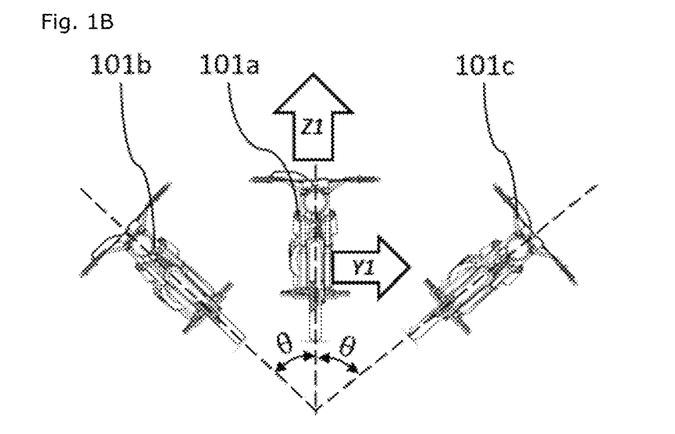
FIG. 1B is a diagram showing a front view of the motorbike of FIG. 1A at three respective tilts with respect to the vertical.

The diagrams of FIG. 1A and of FIG. 1B respectively show, by way of an example, a side view and front views of a motorbike 101 in which the method can be implemented according to embodiments of the invention. This method can be implemented in any type of motorized two-wheeled vehicle, such as a motorized scooter, a limited-speed motorcycle, a moped, a motor scooter, a motorbike (or bike), etc. The two-wheeled vehicle is more specifically powered by a heat engine, or a combustion engine, or even an internal combustion engine. The engine can be an engine with a single cylinder, two cylinders, three cylinders or four or more cylinders. It can be a two-stroke or a four-stroke engine, where appropriate with direct injection or indirect injection.

In one embodiment, the vehicle is equipped with a fuel-injected combustion engine. The engine is then controlled by an electronic control unit (ECU) such as an engine control unit (also in this context abbreviated to ECU). At least one accelerometer is installed in the ECU. This is, for example, an accelerometer produced on a semiconductor product and incorporated into a chip. As stated in the introduction, the measurement of the tilt of the vehicle that is provided by the accelerometer allows the ECU to cut-off the engine in case the vehicle falls, which is determined by the vehicle exceeding a tilt threshold. Indeed, the engine continuing to operate when the vehicle falls represents an additional danger for the rider and an additional risk for the vehicle. Therefore, stopping the engine in case the vehicle falls improves rider safety and decreases the risks for the vehicle. The tilt referred to herein, which causes the triggering of engine shutdown, is the lateral tilt of the vehicle (to one side or to the other, with respect to its direction of travel), with respect to the vertical, which corresponds to the direction of the aforementioned vertical Z axis. "Vertical" is understood herein to be the direction of the force of gravity g.

In FIGS. 1A and 1B, the vertical direction of the chassis of the vehicle 101 is depicted by the thick arrow Z1, which is oriented in an upward direction. The longitudinal direction of the chassis of the vehicle, which also corresponds to its straight-line direction of travel, is depicted by the thick arrow X1, which is oriented in the back-to-front direction. Lastly, the lateral direction of the chassis of the vehicle is depicted by the thick arrow Y1, which is oriented in the right-to-left direction. When the vehicle 101 is perfectly upright on flat ground, the vertical reference direction Z1 is parallel to the vertical direction Z, and the reference directions X1 and Y1 form a plane that is parallel to the plane of the ground defined by the X and Y axes. The X1, Y1 and Z1 axes move with the vehicle 101 and pivot with respect to the X, Y and Z axes associated with the Earth, at the same time as the vehicle.

FIG. 1B illustrates various lateral tilts of the motorbike 101 of FIG. 1A with respect to the vertical. In 101a, the motorbike is in an upright, i.e., vertical, position: its vertical reference axis Z1 is parallel to the direction of the force of gravity g. In positions 101b and 101c, the motorbike is respectively tilted to its right and to its left, in both instances by an angle θ. This bank angle defines the measurement of the tilt of the motorbike with respect to the vertical Z. The ECU relies on continuous measurement and monitoring of the value of this angle θ to shut off the engine, should the vehicle fall sideways.

Figure 2A:
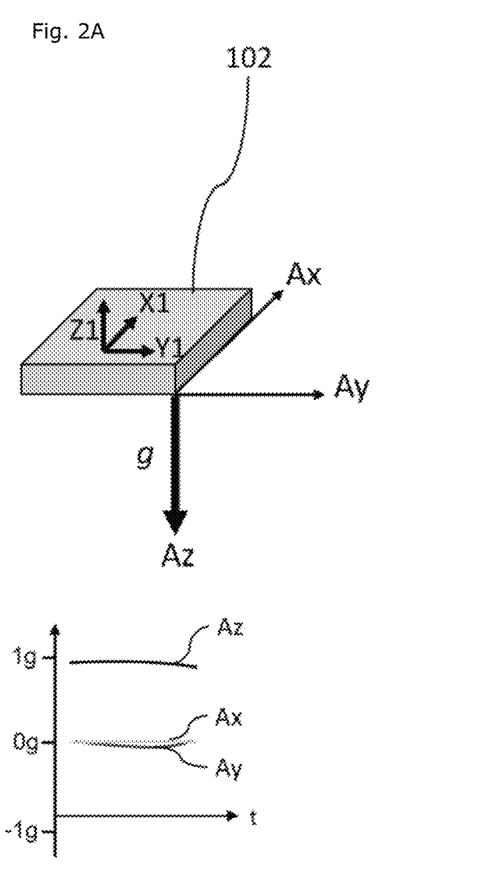
FIG. 2A is a simplified depiction of an accelerometer with three measurement axes and that can be incorporated into an on-board computer of the motorbike of FIGS. 1A and 1B, and of the curves of the evolution, as a function of time, of the acceleration values measured along the three axes of the accelerometer when the motorbike is upright.

FIG. 2A provides, in the upper part, a simplified depiction of an accelerometer 102 that measures acceleration along three axes, for example, three pairwise orthogonal axes. A person skilled in the art will appreciate that a three-axis accelerometer allows the exact angular orientation, with respect to the Earth, of the accelerometer 102, and therefore of the vehicle 101 of FIGS. 1A and 1B, to be determined, when this accelerometer is on board said vehicle, for example, in a computer such as the engine control unit of said vehicle. It is assumed herein, for the simplicity of the present description, that the system of axes associated with the vehicle 101 corresponds to the systems of axes associated with the accelerometer 102. In other words, it is assumed that the accelerometer 102 is fixedly arranged in the computer of the vehicle 101 in such a way that the axes of these sensors coincide with the X1, Y1 and Z1 axes of the vehicle 101, which axes are depicted by the thick arrows in FIGS. 1A and 1B. This is achieved by mounting the accelerometer in the computer and/or by mounting the computer in the vehicle, in such a way as to cause the measurement axes of the sensors of the accelerometers to coincide as precisely as possible with the reference axes X1, Y1 and Z1 of the vehicle. A person skilled in the art will appreciate that, in practice, the accelerometer can adopt a different, and optionally random, angular position with respect to the frame of reference of the vehicle, with determination means and computation means based, for example, on a rotation matrix then being able to allow this difference in orientation to be compensated for so as to be able to operate as if the frame of reference of the accelerometer coincided with that of the vehicle.

The bottom of FIG. 2A shows curves depicting an example of the evolution, as a function of time, of acceleration values measured on these three X, Y and Z axes when the vehicle is kept in a substantially vertical position. In this configuration according to position 101a of the diagram of FIG. 1B, only the measurement axis Z1 of the accelerometer, which is therefore superimposed with the vertical direction, registers a non-zero acceleration Az, namely a signal with a value of 1 g, where g is the unit of acceleration approximately corresponding to the acceleration of gravity on the surface of the Earth, namely approximately 9.81 ms$^2$, to the nearest fluctuations that are dependent on the possible oscillation of the vehicle about the vertical during the measurement period. The acceleration values Ax and Ay provided by the accelerometer for the other measurement directions, namely the longitudinal direction X and the lateral direction Y, respectively, are substantially equal to zero, again to the nearest fluctuations as a function of the stability of the vehicle in the upright position. In FIG. 2A, the force of gravity g is depicted by a thick vertical arrow oriented downward.

Figure 2B:
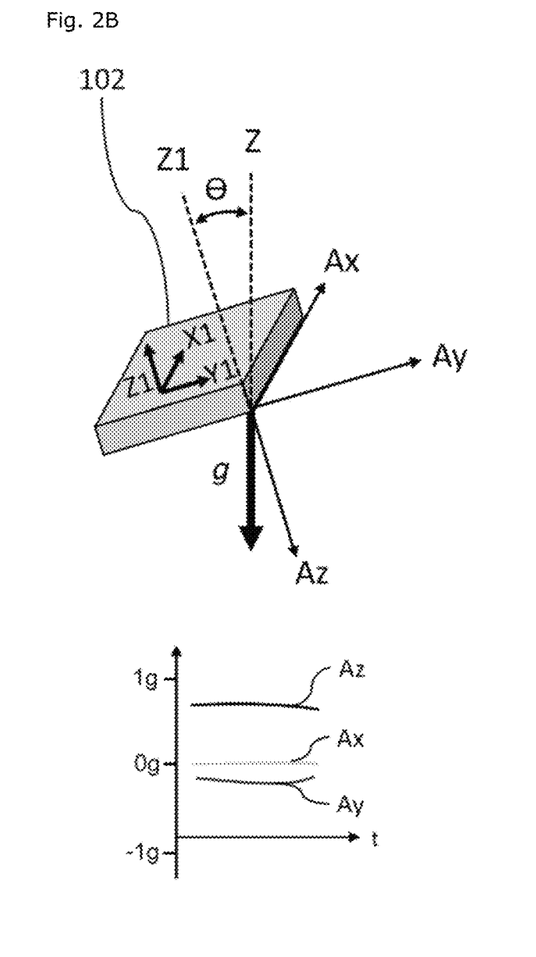
FIG. 2B is a simplified depiction of the accelerometer of FIGS. 2A, and of the curves of the evolution, as a function of time, of the acceleration values measured along the three axes of the accelerometer when the motorbike is tilted by an angle θ with respect to the vertical.

FIG. 2B shows, in the upper part, the same accelerometer 102 when the vehicle is tilted with respect to the vertical direction Z, for example, a lateral tilt to the right corresponding to the position 101b of FIG. 1B. In the example shown, the tilt angle with respect to the vertical axis Z is always denoted θ. Compared to the depiction of the accelerometer 102 shown in the upper part of FIG. 2A, the vertical axis Z1 of the chip of the accelerometer 102 in this case is inclined by an angle θ following the direction of the vertical axis Z. In such a configuration, the bank angle θ is obtained by the following relation: $\theta=\text{abs}[\text{Arctan}((\sqrt{Ax^2+Ay^2})/Az)]$, where Ax, Ay and Az are the acceleration values measured by the accelerometer 102 along each of the X, Y and Z axes, respectively.

The lower part of FIG. 2B shows the evolution, as a function of time, of the values Ax, Ay and Az provided by the accelerometer 102 thus tilted with respect to the vertical Z. Compared with the same curves provided in FIG. 2A, it can be seen that the value Az has diminished slightly and now ranges between 0 and 1 g, whereas the value Ax has not changed and the value Ay has diminished slightly and now ranges between 0 and −1 g (for an angle θ ranging between 0 and 45°, in the example shown).

Figure 3:
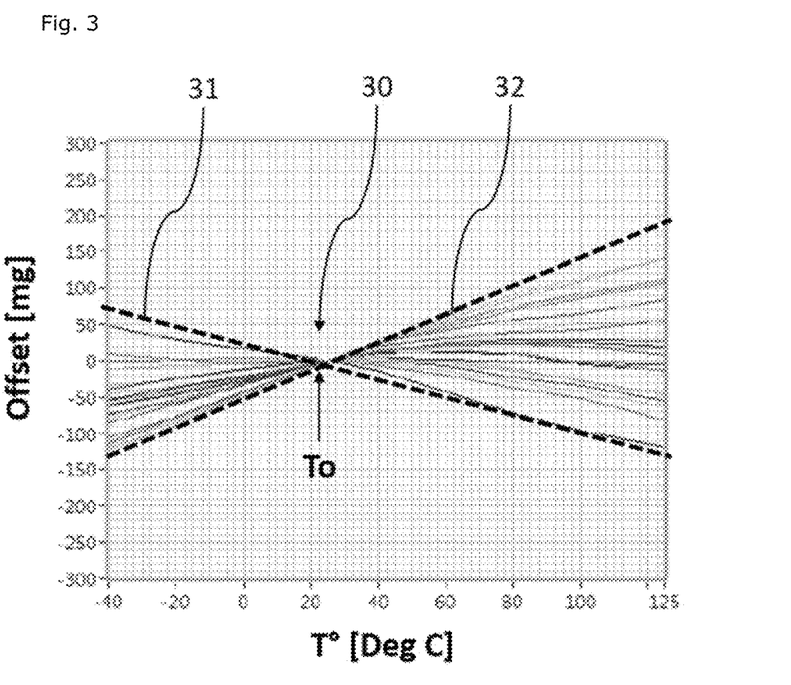
FIG. 3 is a graph showing a set of curves depicting the divergence of the temperature drift of a determined batch of accelerometers.

The phenomenon of temperature drift of the accelerometers that can be used in the context of the contemplated applications will now be discussed with reference to the graph in FIG. 3. The figure shows a collection of curves that provide the drift, or shift, or offset (expressed in mg, i.e., in thousandths of the value g, which is the acceleration due to the Earth's force of attraction g), as a function of the temperature T° (expressed in degrees Celsius or Deg C. or ° C.), for a set of different accelerometers that are all the same model. This batch of accelerometers originates, for example, from the same manufacturing run. In this respect, the considered accelerometers are supplied by the manufacturer as having identical measurement features.

However, due to uncontrolled (and possibly uncontrollable) factors in their manufacturing method and/or in the materials used, the accelerometers from the same batch exhibit divergence in terms of features. A person skilled in the art will appreciate that, even though it is only the drift in the acceleration values supplied as a function of ambient temperature that is of concern herein, divergence in features is an overall phenomenon that can affect all the features of such a component. The collection of curves shown in FIG. 3 highlights three pieces of information.

On the one hand, all the accelerometers effectively provide the same temperature measurement at a nominal temperature equal to around 20° C. in the example shown. At this nominal temperature, all the accelerometers exhibit an offset that is substantially equal to zero. Visually, this is expressed by the fact that all the curves pass through a nominal point corresponding to 20° C. on the abscissa axis and to 0 mg on the ordinate axis. This value of 20° C. is not by chance, since it substantially corresponds to the value of the ambient temperature at which the accelerometers are assumed to operate in the majority of applications. For this reason, manufacturers generally guarantee a zero, or at least minimal, offset at this nominal temperature. Of course, a person skilled in the art will appreciate that, depending on the applications for which a model of accelerometer is intended, the value of this nominal temperature can differ from 20° C.

Furthermore, each accelerometer exhibits a linear drift as a function of the temperature, within the temperature range ranging between −40° C. and plus 125° C. that is depicted in the figure. In other words, the depicted curves are substantially inclined straight lines. Some accelerometers exhibit drift with an offset coefficient (or drift coefficient) that is positive, which results in an ascending straight line as a function of the temperature, whereas others have a drift with a negative offset coefficient, resulting, conversely, in a descending straight line as a function of the temperature.

Finally, all the accelerometers exhibit drift that is limited between a minimum negative offset coefficient and a maximum positive offset coefficient, depicted by the straight lines 31 and 32, respectively. In other words, the offset coefficient for the batch of accelerometers originating from the same manufacturing run ranges between a negative value Off_31 and a positive value Off_32, corresponding to the slope of the straight line 31 and to the slope of the straight line 32, respectively.

The principle behind the method according to embodiments of the invention is that, since the temperature drift of the accelerometers is linear, all that is required, in order to determine said drift and be able to compensate for it when measurements are taken using a determined accelerometer, is knowledge, on the one hand, of the value of the slope of the corresponding straight line and, on the other hand, of a determined measurement point through which this straight line passes. In other words, rather than characterizing the temperature drift of each accelerometer across all their ranges of possible operating temperatures, which is lengthy and painstaking and probably at the very least difficult to perform autonomously using the means on board the vehicle, all that is required is to learn these two items of information in order to be capable of compensating for the temperature drift by appropriately correcting each acceleration measurement taken using said accelerometer.

Advantageously, learning according to embodiments of the method involves determining a reference measurement point substantially corresponding to the value of the nominal temperature for which the accelerometers are guaranteed by the manufacturer to be reliable, namely 20° C. in this example. Indeed, on the one hand, this temperature is the standard ambient temperature in the majority of applications, which means that all that is required is to create such standard temperature conditions and thereby be substantially at this nominal temperature. In the application considered herein, this involves selecting conditions in which the vehicle engine is cold, because it is known that a hot engine provides an ambient temperature in the vicinity thereof that greatly exceeds the standard ambient temperature, namely around 20° C. Another advantage of operating at this reference measurement point is that it lies at the node 30 at which all the straight lines representing the temperature drift of the accelerometers liable to be used intersect, which means that the effects of a potential shift with respect to this reference measurement point within the batch of relevant accelerometers is circumvented as well as possible.

Figure 4:
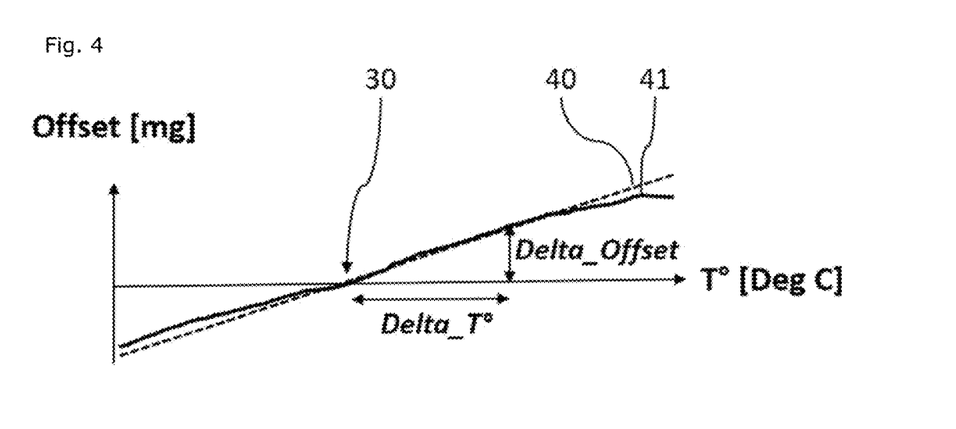
FIG. 4 is a graph illustrating the computation of the slope of a curve depicting the temperature drift of a determined accelerometer.

The graph of FIG. 4 shows a curve 41 of the temperature drift of a determined accelerometer, and the straight line 40, by means of which this drift can be approximately defined. The straight line 40 and the curve 41 both pass through the node 30, which corresponds to the reference measurement point defined by the temperature To on the abscissa axis and a zero offset value on the ordinate axis.

In order to determine the slope of the straight line 40, a given difference Delta_T° simply needs to be known between two temperature values of the curve 41, together with the difference Delta_Offset between the two corresponding offset values of the curve 41. The slope of the straight line 40 then can be computed by computing the ratio of Delta_Offset to Delta_T°.

It should be noted that the higher the temperature difference Delta_T°, the lower the risk of error in the computation of the slope. In other words, the more widely spaced apart the measurement points within the range of operating temperatures of the accelerometer, the better the precision with which the slope of the temperature drift of the accelerometer is determined.

It also should be noted that, even though the curve 41 substantially follows the aspect of the straight line 40 by which it can be estimated, local variations over a small temperature interval can locally give rise to a different slope from the ideal slope of the depicted straight line 40. In some very specific cases, the slope of the curve 41 can locally have a sign that is the opposite of that of the slope of the straight line 40. In other words, measurement artefacts can, over a small temperature range, give rise to a break in the monotony of the temperature drift of the accelerometer.

Figure 5:
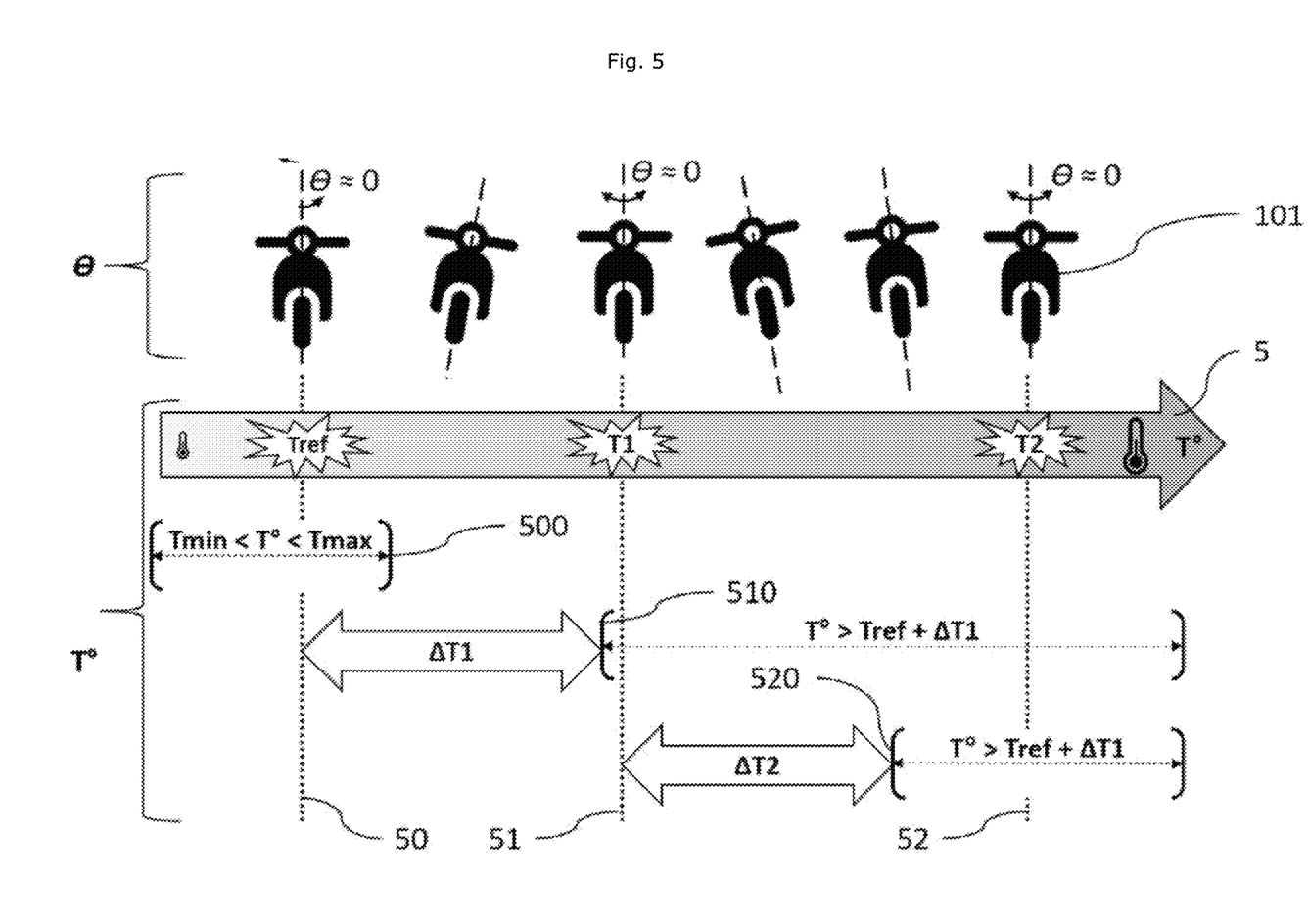
FIG. 5 is a functional diagram illustrating the implementation of the steps of the method of the invention.

With reference to the diagram of FIG. 5, a description will now be provided of the principle of the embodiments of the method, which allows the temperature drift of a determined accelerometer to be reliably and effectively learnt, once it has been mounted in a given two-wheeled vehicle, for example, in the housing of a computer on board said vehicle.

A thick horizontal arrow 5 is depicted in the middle of the figure, oriented from left to right, and symbolically depicting the increase in temperature of the combustion engine of the two-wheeled vehicle. In the case of standard use, the lowest temperature T° corresponds to the ambient temperature when the engine is started, from the situation known as "engine cold", which is, for example, equal to +20° C. Furthermore, the highest temperature T° of the engine, in the situation known as "engine hot", corresponds to the maximum temperature taking into account any cooling means optionally present in the vehicle, on the one hand, and the conditions of use (i.e., vehicle with the engine running but stationary, or vehicle running and subjected to the apparent wind resulting from the relative motion of the vehicle with respect to the air), on the other hand, and which is, for example, equal to +90° C. Of course, in some extreme cases, the minimum temperature for starting a cold engine can be below or above +20° C., and typically can range between −20° C. and +55° C. Also, the maximum temperature reached by a hot engine can be above +90° C., and for example, reach temperatures of up to +125° C.

Various angular positions of the motorbike 101 of FIGS. 1A and 1B are depicted above the arrow 5, around the upright position in which the axis Z1 of the frame of reference X1, Y1 and Z1 of the vehicle is oriented in the vertical direction Z of the Earth frame of reference X, Y, Z.

Three temperature intervals 500, 510 and 520 are depicted below the arrow 5, which will be referred to hereafter. Three acceleration measurement points 50, 51 and 52 are also depicted where the accelerometer on board the vehicle 101 measures the acceleration, at which points, on the one hand, the vehicle 101 is upright (in other words, the angle θ with respect to the Earth's vertical is substantially equal to zero), and at which points, on the other hand, the temperature T° is included within the temperature interval 500, within the temperature interval 510, and within the temperature interval 520, respectively. The temperatures corresponding to the three measurement points 50, 51 and 52 are denoted Tref, T1 and T2, respectively. Throughout the remainder of the disclosure, these temperatures will sometimes be referred to as reference temperature Tref, first learning temperature T1 and second learning temperature T2, respectively. Similarly, the temperature intervals 500, 510 and 520 are sometimes referred to as reference temperature interval 500, first learning temperature interval 510 and second learning temperature interval 520, respectively.

As indicated above, the reference temperature Tref is a temperature at which an acceleration measurement is produced by the accelerometer at a reference measurement point 50, at which the vehicle is upright (θ=0) and at which the temperature T° in the environment of the accelerometer is included within the reference temperature interval 500. This temperature interval 500 corresponds, for example, to the interval between a minimum temperature Tmin and a maximum temperature Tmax, which define the range of ambient temperatures that can be encountered, at engine start-up, from the "engine cold" situation, in the contemplated applications. As already indicated above, Tmin thus can be equal to −20° C. and Tmax can be equal to plus +55° C.

In one example, the lower limit for the first learning temperature interval 510 can be equal to the reference temperature Tref increased by a first temperature difference ΔT1. In other words, the reference temperature Tref and the first learning temperature interval 510 are spaced apart, in terms of temperature, by a temperature difference ΔT1. The upper limit for the first learning temperature interval 510 can be equal to the maximum temperature that can be contemplated, namely +125° C. in this example. A person skilled in the art will appreciate that, as an alternative embodiment, the interval 510 may have no upper limit, which amounts to the same thing for the purposes of understanding the present disclosure, and is simpler in practice for implementing this method using software engineering. Again, in other words, the temperature interval 510 can include the temperatures T° for which T°>Tref+ΔT1.

Similarly, the lower limit for the second learning temperature interval 520 can be equal to the first learning temperature T1 increased by a second temperature difference ΔT2. In other words, the first learning temperature interval T1 and the second learning temperature interval 520 are spaced apart, in terms of temperature, by a temperature difference ΔT2. The upper limit for the second learning temperature interval 520 can be equal to the maximum temperature that can be contemplated, namely +125° C. in this example. As an alternative embodiment, like the interval 510, the interval 520 has no upper limit. Again, in other words, the temperature interval 520 can include the temperatures T° for which T°>T1+ΔT2.

From a functional standpoint, the purpose of the temperature differences ΔT1 and ΔT2 is to provide a temperature distance between the first learning temperature T1 and the reference temperature Tref, and between the second learning temperature T2 and the first learning temperature T1, respectively, which distance is sufficient to afford better precision and greater reliability in estimating the slope of the temperature drift of the accelerometer between the measurement points 51 and 50, and between the measurement points 52 and 51, respectively. Indeed, and as stated above with reference to FIG. 4, the more widely spaced apart the measurement points between which the slope of a straight line is estimated, the better the estimate will be.

In some embodiments, the temperature difference ΔT1 and/or the temperature difference ΔT2 can be greater than 30° C., for example, ranging between 30° C. and 40° C.

Figure 6:
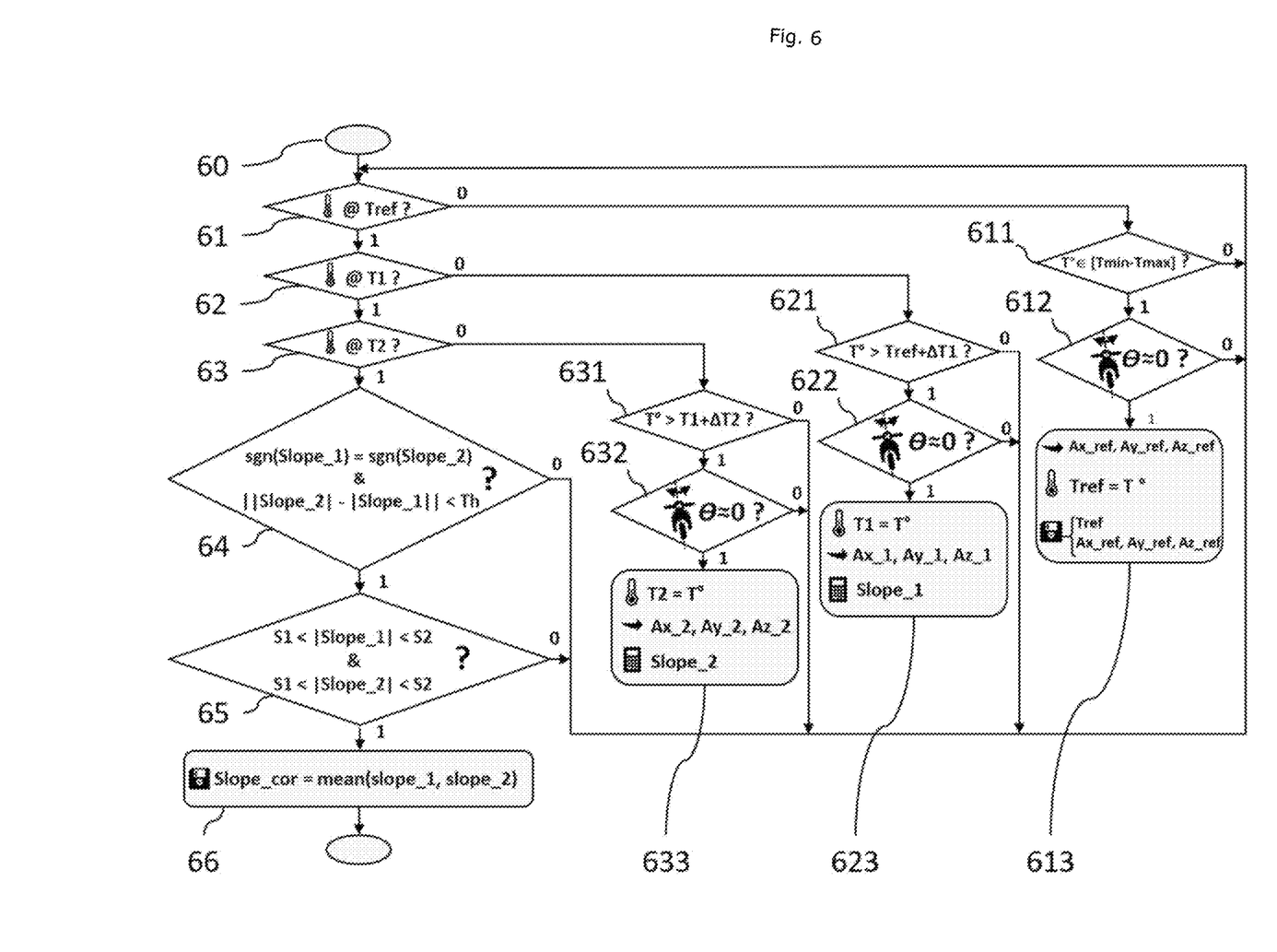
FIG. 6 is a diagram of steps illustrating examples of implementing the learning phase of the method.

Embodiments of the learning procedure for learning the temperature drift of an accelerometer in the context of the invention will now be described with reference to the diagram of steps of FIG. 6. This description is also provided with reference to FIG. 5, which illustrates this context.

The method begins at step 60.

Step 61 involves determining whether or not the reference measurement Aref has been taken at the reference measurement point 50. If so, the method proceeds to step 62. Otherwise, it proceeds to step 611.

Step 611 involves determining whether the ambient temperature T° in the vicinity of the accelerometer is included within the reference temperature interval 500. If not, the procedure re-starts with the execution of step 61. If so, the method proceeds to step 612.

Step 612 involves determining whether the vehicle is upright, namely whether the particular condition referred to as "bike upright" is present. In other words, this involves determining whether or not the angle θ between the vertical axis Z1 of the accelerometer and the vertical axis Z of the Earth frame of reference is substantially zero. This condition can be verified from a combination of status signals from various sensors of the vehicle. For example, it can be based on one or more items of information supplied by a sensor on the key of the vehicle, a sensor on the vehicle clutch, a sensor on the kickstand (central stand or side stand), a vehicle speed sensor, an engine speed sensor (indicating whether the engine is turning over at low idle or whether it is accelerating), etc. If the bike is not upright then the procedure re-starts by executing step 61. If, on the other hand, the bike is upright, then the method continues to step 613.

Step 613 records the reference measurement Aref provided by the accelerometer. In other words, the triplet of values {Ax_ref, Ay_ref, Az_ref} corresponding to the indications provided by the accelerometer is obtained. Furthermore, the temperature T° provided at this moment by a temperature sensor is recorded, which defines the reference temperature Tref. In other words, step 613 involves carrying out the reference measurement 50 of FIG. 5. Furthermore, the temperature Tref and the triplet of values {Ax_ref, Ay_ref, Az_ref} are recorded in a non-volatile memory of the computer so that they can be subsequently recovered in order to carry out the next steps of the method.

Step 62 involves determining whether or not the first learning measurement A1 has been taken at the first learning measurement point 51 of FIG. 5. If so, the method proceeds to step 63. Otherwise, it proceeds to step 621.

Step 621 involves determining whether the ambient temperature T° in the vicinity of the accelerometer is included within the first learning temperature interval 510. If not, the procedure re-starts with the execution of step 61. If so, the method proceeds to step 622.

Step 622 involves determining whether the vehicle is upright, namely whether the particular condition referred to as "bike upright" is present. In other words, this involves determining whether or not the angle θ between the vertical axis Z1 of the accelerometer and the vertical axis Z of the Earth frame of reference is substantially zero. This condition can be verified in the same way as in step 612 already described above. If the bike is not upright, the procedure then re-starts with the execution of step 61. If, on the other hand, the bike is upright, then the method continues to step 623.

Step 623 records the first learning measurement A1 provided by the accelerometer. In other words, the triplet of values {Ax_1, Ay_1, Az_1} corresponding to the indications provided by the accelerometer is obtained. Furthermore, the temperature T° provided at this moment by a temperature sensor is recorded, which defines the first learning temperature T1. In other words, step 623 involves carrying out the first learning measurement 51 of FIG. 5.

Furthermore, with the temperature value T1 and the triplet of values {Ax_1, Ay_1, Az_1}, as well as the temperature Tref and the triplet of values {Ax_ref, Ay_ref, Az_ref} recovered from the non-volatile memory of the computer, a first slope coefficient Slope_1 for the temperature drift of the accelerometer is computed, as explained above with reference to FIG. 4. More specifically, the slope is computed for each of the axes of the accelerometer. It follows that the slope coefficient Slope_1 is in fact a three-dimensional vector, i.e., is defined by a triplet of values {Slope_1x, Slope_1y, Slope_1z}.

For the X axis, for example, the value Slope_1x is obtained by computing the ratio of the difference (Ax_1−Ax_ref) between Ax_1 and Ax_ref to the difference (T1−Tref) between T1 and Tref; and likewise for the Y and Z axes. The values {Slope_1x, Slope_1y, Slope_1z} thus obtained are temporarily saved until the end of the execution of the procedure.

Step 63 involves determining whether or not the second learning measurement A2 has been taken at the second learning measurement point 52 of FIG. 5. If so, the method proceeds to step 64. Otherwise, it proceeds to step 631.

Step 63 involves determining whether the ambient temperature T° in the vicinity of the accelerometer is within the second learning temperature interval 520. If not, the procedure re-starts with the execution of step 61. If so, the method proceeds to step 632.

Step 632 involves determining whether the vehicle is upright, namely whether the particular condition referred to as "bike upright" is present. In other words, this involves determining whether or not the angle θ between the vertical axis Z1 of the accelerometer and the vertical axis Z of the Earth frame of reference is substantially zero. This condition can be verified in the same way as in step 612 and step 622 already described above. If the bike is not upright, the procedure then re-starts with the execution of step 61. If, on the other hand, the bike is upright, then the method continues to step 633.

Step 633 involves recording the first learning measurement A2 provided by the accelerometer. In other words, the triplet of values {Ax_2, Ay_2, Az_2} corresponding to the indications provided by the accelerometer is obtained. Furthermore, the temperature T° provided at this moment by a temperature sensor is recorded, which defines the second learning temperature T2. In other words, step 633 involves carrying out the second learning measurement 52 of FIG. 5.

Furthermore, with the temperature value T2 and the triplet of values {Ax_2, Ay_2, Az_2}, as well as the temperature Tref and the triplet of values {Ax_ref, Ay_ref, Az_ref} recovered from the non-volatile memory of the computer, a second slope coefficient Slope_2 for the temperature drift of the accelerometer is computed, as explained above with reference to FIG. 4. More specifically, the slope is computed for each of the axes of the accelerometer. It follows that the slope coefficient Slope_2 is in fact a three-dimensional vector, i.e., is defined by a triplet of values {Slope_2x, Slope_2y, Slope_2z}.

For the X axis, for example, the value Slope_2x is obtained by computing the ratio of the difference (Ax_2−Ax_ref) between Ax_2 and Ax_ref to the difference (T2−Tref) between T2 and Tref; and likewise for the Y and Z axes. The values {Slope_2x, Slope_2y, Slope_2z} thus obtained are temporarily saved until the end of the execution of the procedure.

Step 64, which is optional, involves verifying the monotony of the temperature drift of the accelerometer, as determined twice in succession, in steps 623 and 633, respectively. In other words, it involves verifying that the sign of the temperature drift slope coefficient Slope_1 determined between the measurement points 51 and 50, and the sign of the temperature drift slope coefficient Slope_2 determined between the measurement points 52 and 50 are identical. If they are not identical [i.e., if sgn(Slope_2)≠sgn(Slope_1), where "sgn" denotes the mathematical operator "sign of"], then the procedure re-starts with the execution of step 61. This allows the aforementioned measurement artefacts to be circumvented, which may cause the slopes measured at several measurement points to have opposite signs to one another, even though in practice such an outcome is incoherent. For this reason, if the signs of the slope coefficients Slope_1 and Slope_2 are not the same as one another, the process is interrupted.

Furthermore, in some embodiments, step 64 (or in an independent step 64a) also involves verifying that the absolute value of the difference between the respective absolute values of the first temperature drift coefficient Slope_1 and of the second temperature drift coefficient Slope_2 is below a determined threshold Th. Indeed, a difference between the values of these coefficients would once again indicate a measurement artefact, which would be incoherent and justify stopping the process. The procedure then re-starts with the execution of step 61. In one non-limiting example, the threshold Th can be equal to 1.5 mg/° C.

If the test or tests carried out in step 64 have a positive outcome, then the method proceeds to step 65, which is also optional. Step 65 involves determining whether, in addition, the absolute value of the first slope coefficient Slope_1 for the accelerometer temperature drift and the absolute value of the second slope coefficient Slope_2 for the accelerometer temperature drift are included within a determined interval of values, ranging between values S1 and S2. These values S1 and S2 can be equal to, or connected with, the negative value Off_31 and the positive value Off_32, which correspond to the slope of the straight line 31 and to the slope of the straight line 32, respectively, of FIG. 3. The purpose of step 65 is, like that of step 64, to exclude measurement results that might be incoherent from the standpoint of the expected behavior of the accelerometer as a function of the temperature, so as to preserve the reliability of the method notwithstanding measurement artefacts, which are always possible.

If the result of the test in step 65 is negative, the process is interrupted and the procedure re-starts with the execution of step 61. If the result of the test is positive, the method proceeds to step 66.

Step 66 involves obtaining a single temperature drift coefficient Slope_cor, on the basis of the first temperature drift coefficient Slope_1 and of the second temperature drift coefficient Slope_2. This single temperature drift coefficient Slope_cor is recorded in the non-volatile memory of the computer. This thus can be used subsequently, in a correction phase, in which an acceleration value indicated by the accelerometer at a given measurement point at which the temperature is equal to a current temperature value T° is corrected as a function of, on the one hand, the difference between said current temperature value and the reference temperature value Tref, and, on the other hand, the single temperature drift coefficient Slope_cor determined by the learning procedure described above.

In one embodiment, the single temperature drift coefficient Slope_cor is obtained by computing a mean of the first temperature drift coefficient Slope_1 and of the second temperature drift coefficient Slope_2. This can be the arithmetic mean of the values Slope_1 and Slope_2, or any other mean, such as a quadratic mean, for example.

Once the temperature drift coefficient Slope_cor has been obtained and stored in a memory as explained above with reference to FIGS. 5 and 6, which illustrate the learning phase, it can be subsequently used throughout the operational life of the vehicle to correct any acceleration measurement Ai provided by the on-board accelerometer at any temperature Ti. Indeed, the corrected acceleration measurement Ai_cor can be obtained, for each of the axes of the accelerometer, from the value Ai provided by said accelerometer, from the current value T1 of the temperature, and also from the value Tref of the reference temperature and from the value of the temperature drift coefficient Slope_cor, which are stored in the non-volatile memory of the computer. This is carried out by executing the following computation, for each axis: Ai_cor=Ai+Slope_cor*(Ti−Tref).

A person skilled in the art will appreciate that obtaining the single temperature drift coefficient Slope_cor from two coefficients such as the first temperature drift coefficient Slope_1 and the second temperature drift coefficient Slope_2 means that, on the one hand, at the very least, tests on the coherency of the measurements, such as the tests in steps 64 and 65, can be carried out, and, on the other hand, a very wide range of temperatures can be covered. Indeed, in the contemplated application for compensating for the temperature drift of an accelerometer for measuring the bank angle of a two-wheeled vehicle with a combustion engine, the range of operating temperatures of the accelerometer is very high during the phase in which the temperature of the combustion engine of the motorcycle is increasing from the "engine cold" situation, since it can extend from −20° C. or less, up to +90° C. or more.

In some embodiments, a reference acceleration value Aref at the reference measurement point (i.e., the reference measurement at the reference measurement point 50 in FIG. 5) can be acquired with the engine switched off, as it leaves the vehicle production line, whereas the other steps of the learning phase for learning the temperature drift of the accelerometer, and notably acquiring the first and second learning measurements at the learning measurement points 51 and 52, can be/are carried out subsequently, with the engine running, either at the sales outlet just before the vehicle is delivered to its initial owner, or during the first few kilometers on the road by the end-user. This means that the vehicle manufacturer is not forced to carry out a procedure whereby the temperature of the vehicle is increased, which is not necessarily required for other purposes and which they may wish to avoid.

The present invention has been described and illustrated in the present detailed description and in the figures of the attached drawings in possible embodiments. However, the present invention is not limited to the presented embodiments. Other variants and embodiments can be deduced and implemented by a person skilled in the art after reading the present description and studying the appended drawings.

In the claims, the term "comprise" or "include" does not exclude other elements or other steps. A single processor or a plurality of other units can be used to implement the invention. The various features presented and/or claimed advantageously can be combined. Their presence in the description or in different dependent claims does not exclude this possibility. The reference signs should not be understood as limiting the scope of the invention.

The invention claimed is:

1. A method for compensating for a temperature drift of an accelerometer for measuring the tilt of a two-wheeled motor vehicle with a combustion engine, said method comprising:
   a learning phase for learning the temperature drift of the accelerometer, and comprising:
   acquiring a reference acceleration value at a reference measurement point at which the vehicle is upright and the temperature is equal to a first reference temperature value, which is included within a range of reference temperature values corresponding to an "engine cold" state, and which is stored in a non-volatile memory in relation to the reference acceleration value;
   acquiring a first acceleration measurement value at a first measurement point, different from the reference measurement point, and at which the vehicle is substantially upright and the temperature is equal to a first temperature measurement value, which is included within a first range of temperature values substantially above the first reference temperature value;
   computing a first temperature drift coefficient, defined as being the ratio of the difference between the first acceleration measurement value and the reference acceleration value, on the one hand, to the difference between the first temperature measurement value and the first reference temperature value, on the other hand;
   acquiring a second acceleration measurement value at a second measurement point, at which the vehicle is substantially upright and the temperature is equal to a second temperature measurement value, which is included within a second range of temperature values substantially above the first temperature measurement value;
   computing a second temperature drift coefficient, defined as being the ratio of the difference between the second acceleration measurement value and the reference acceleration value, on the one hand, to the difference between the second temperature measurement value and the first reference temperature measurement value, on the other hand; and
   obtaining and storing, in the non-volatile memory, a single temperature drift coefficient, on the basis of the first temperature drift coefficient and of the second temperature drift coefficient; as well as,
   a correction phase, in which an acceleration value indicated by the accelerometer at a given measurement point at which the temperature is equal to a current temperature value is corrected as a function of the difference between said current temperature value and the reference temperature value, on the one hand, and of the single temperature drift coefficient, on the other hand.

2. The method as claimed in claim 1, wherein obtaining and storing the single temperature drift coefficient are only carried out if the first temperature drift coefficient and the second temperature drift coefficient are signed numerical values having the same sign.

3. The method as claimed in claim 2, wherein obtaining and storing the single temperature drift coefficient are only carried out if, in addition, the absolute value of the difference between the respective absolute values of the first temperature drift coefficient and of the second temperature drift coefficient is below a determined threshold.

4. The method as claimed in claim 2, wherein obtaining and storing the single temperature drift coefficient are only carried out if, in addition, the absolute value of the first temperature drift coefficient and the absolute value of the second temperature drift coefficient are included within a determined interval of values.

5. The method as claimed in claim 1, wherein the single temperature drift coefficient is obtained by computing a mean of the first temperature drift coefficient and of the second temperature drift coefficient.

6. The method as claimed in claim 1, wherein the first range of temperature values includes temperature values at least 30° C. above the reference temperature value.

7. The method as claimed in claim 1, wherein the second range of temperature values includes temperature values at least 30° C. above the first measured temperature value.

8. The method as claimed in claim 1, wherein the range of reference temperature values includes temperature values between −20° C. and +55° C.

9. The method as claimed in claim 1, wherein, with the accelerometer being a multi-axis accelerometer, all the steps of the method are carried out simultaneously for each axis of the accelerometer.

10. The method as claimed in claim 1, wherein acquiring a reference acceleration value at the reference measurement point is carried out with the engine switched off, as it leaves the vehicle production line, whereas the other steps of the learning phase for learning the temperature drift of the accelerometer are carried out subsequently, with the engine running.

11. A device for compensating for a temperature drift of an accelerometer for measuring the tilt of a two-wheeled motor vehicle with a combustion engine, comprising an electronic control unit for the two-wheeled motor vehicle with a combustion engine comprising an accelerometer and means for measuring, while the vehicle is running, the lateral tilt of the vehicle with automatic cut-off of the engine when a tilt threshold is exceeded, means for determining the ambient temperature, means for determining the engine temperature, means for determining whether the vehicle is upright, and comprising means configured to implement all the steps of a method as claimed in claim 1.

12. A non-transitory computer program product comprising one or more sequences of instructions stored on a machine-readable storage medium comprising a processor, said sequences of instructions being suitable for carrying out all the steps of the method as claimed in claim 1 when the program is read from the storage medium and executed by the processor.

13. The method as claimed in claim 3, wherein obtaining and storing the single temperature drift coefficient are only carried out if, in addition, the absolute value of the first temperature drift coefficient and the absolute value of the second temperature drift coefficient are included within a determined interval of values.

\* \* \* \* \*